United States Patent
Chamlee

[19]

[11] Patent Number: 5,980,792
[45] Date of Patent: Nov. 9, 1999

[54] PARTICULATE FIELD DISTRIBUTIONS IN CENTRIFUGALLY CAST COMPOSITES

[76] Inventor: Thomas C. Chamlee, 17438 - 174$^{th}$ Ave. NE., Woodinville, Wash. 98072

[21] Appl. No.: 08/922,952

[22] Filed: Sep. 3, 1997

Related U.S. Application Data

[60] Provisional application No. 60/016,111, Sep. 4, 1996.

[51] Int. Cl.$^6$ ............... B29C 37/02; B22D 29/00
[52] U.S. Cl. ............... 264/40.1; 264/138; 264/310; 264/40.6; 164/69.1
[58] Field of Search ............... 264/138, 310, 264/40.1, 40.6; 164/457, 69.1, 97

[56] References Cited

U.S. PATENT DOCUMENTS

| | | |
|---|---|---|
| 3,868,267 | 2/1975 | Gazza et al. . |
| 4,382,803 | 5/1983 | Allard ............... 51/298 |
| 4,662,429 | 5/1987 | Wada et al. ............... 164/461 |
| 4,806,704 | 2/1989 | Belke, Jr. et al. ............... 174/52.4 |
| 5,002,115 | 3/1991 | Noordegraaf et al. ............... 164/97 |
| 5,025,849 | 6/1991 | Karmarkar et al. ............... 164/97 |
| 5,186,234 | 2/1993 | Hammond et al. ............... 164/97 |
| 5,324,472 | 6/1994 | Page et al. ............... 264/311 |
| 5,531,425 | 7/1996 | Skibo et al. ............... 266/208 |
| 5,532,282 | 7/1996 | Needham ............... 521/93 |
| 5,560,420 | 10/1996 | Hansen et al. ............... 164/114 |

FOREIGN PATENT DOCUMENTS

| | | | |
|---|---|---|---|
| 58-116970 | 7/1983 | Japan | ............... B22D 13/06 |

*Primary Examiner*—Christopher A. Fiorilla
*Attorney, Agent, or Firm*—Ronald M. Anderson

[57] ABSTRACT

Centrifugal casting is used to establish a gradient profile of reinforcement particulate densities in a carrier matrix of a polymer resin and in an aluminum alloy. Cast disks of silicon carbide (SiC) reinforced resin and Al-Si/SiC particulate reinforced MMCs have been produced that show a gradient of SiC increasing from a denuded region adjacent to an axis of rotation of the disk to a maximum density at the periphery of the disk. An applied centrifugal acceleration applied by rotating the mold is used to establish an artificial settling of the particulate field in a homogeneous mixture of a fluid matrix and the particulates. The principle parameters in establishing a range of particulate densities in centrifugally cast particulate composites are the centrifugal acceleration applied and the length of time the matrix material remains in a liquid state. The magnitude of these parameters are determined by the specifics of a particular casting design.

40 Claims, 6 Drawing Sheets

PARTICULATE FIELD DISTRIBUTIONS IN CENTRIFUGALLY CAST COMPOSITES

RELATED APPLICATION

This application is a continuation-in-part patent application, based on prior copending provisional application Ser. No. 60/016,111, filed Sep. 4, 1996, the benefit of the filing date of which is hereby claimed under 35 U.S.C. § 119(e).

FIELD OF THE INVENTION

The present invention generally relates to casting shaped objects using a composite material, and more specifically, to centrifugally casting shaped objects from a composite material that includes particulate reinforcement.

BACKGROUND OF THE INVENTION

Over the past two decades, the use of composite materials has become increasingly widespread. Fiber-reinforced polymeric composites make up the bulk of the composite materials that are used, particularly in low temperature and structural applications. The processing of composite materials is typically applied to objects having a relatively simple geometry—primarily surfaces and tubes. Fabrication of more complex shapes from composites generally requires secondary joining and/or machining processes and subsequent assembly of component parts, which introduce complexity tending to both limit potential applications and increase the concomitant costs.

For high temperature applications, metal matrix composites (MMCs) offer improved mechanical properties and significant mass reduction compared to conventional metal alloys. One of the most common forms of MMCs is an aluminum alloy that is reinforced with silicon carbide particles. This type of MMC is becoming more readily available in both wrought and foundry grade remelt billets. However, the range of available shapes for wrought materials of this type is again limited to relatively simple shapes that are common to standard rolling and extrusion practices; complex designs require additional manufacturing processes and joining of subassemblies. In contrast, high quality MMC components can be readily produced at relatively low cost using a casting process.

A wide range of casting techniques are currently incorporated for the production of particulate or short fiber reinforced composites, including spray processes, dispersion processes, and pressure impregnation. In the spray process, a gas atomized liquid matrix is co-sprayed with reinforcing dispersoids onto a mandrel or substrate to form a consolidated cast composite part or layer. This process lends itself to the manufacture of tubes and other shapes of revolution, or flat stock. Dispersion processes include stir and compocasting, and screw extrusion. In the stir and compo-casting of composites, particulates or short fibers are mechanically mixed with a liquid or partially crystallized slurry and then introduced to a shaped mold. The screw extrusion process uses a screw extruder to act as both a mechanical mixer and a viscosity pump to produce extruded shapes or billets.

Pressure impregnation processes include pressure infiltration and squeeze casting. Both processes rely on gas pressure differentials or mechanical pressure to impregnate a preform of consolidated particulates or short fibers with a matrix material. Generally, each of the aforementioned types of processes may be applied to either polymer or metal matrix material systems.

Composite materials with increasing levels of reinforcement typically have unique casting limitations that limit their use in more conventional casting processes. Each of the casting processes noted above represents an attempt to overcome some of these limitations, but all are, in general, more complicated and expensive than standard single alloy casting practices.

One of the most significant casting limitations of composite materials is the reduction of fluidity that results from the presence of high volume fractions of reinforcing particulates or short fibers. The low fluidity of a liquid composite material greatly restricts the distance that the material may flow into a typical casting mold and the size of the minimum cross section through which the material may pass. This limited fluidity can severely limit the allowable complexity and detail of the part being cast, as well as limit the volume fraction of reinforcement used.

Another important casting limitation of composite materials relates to the difficulty of producing a homogenous mixture of reinforcing particulates or short fibers, and a matrix material. Typically, the reinforcing particulates or short fibers are mixed with the matrix material prior to casting by mechanical means. When reinforcement particulates are introduced into a fluid matrix and homogenized by a mechanical mixing head, a by-product of the mixing process is the creation of gas bubbles that survive in the cast product, causing undesirable porosity. The presence of this porosity in the final solidified part can adversely affect its overall mechanical properties to an unacceptable degree.

In the case of MMCs, the mixing of reinforcing particulates or short fibers into the matrix prior to casting, at temperatures above the liquidus temperature of the matrix material, increases the likelihood of the formation of reaction by-products of the reinforcement and matrix materials. For example, aluminum carbide is readily formed at the interface between SiC particulates and an aluminum alloy matrix at elevated melt temperatures. For most high temperature composite systems, the reaction byproduct that is formed is an intermetallic material that typically exhibits brittle mechanical behavior. The presence of a brittle interface between the reinforcing particulate and the matrix can lead to a significant decrease in tensile, fracture, and fatigue properties of a cast MMC part, as well as further reduction in the overall fluidity of the mix during the casting process. To overcome some of the problems associated with the low fluidity of the composite melt, volume fraction of the reinforcement particulates or short fibers added to the matrix is typically limited to a relatively low level, e.g., from 3 to 20 percent by volume, thereby limiting the material property improvement that can be achieved by the addition of the particulates or short fibers to the composite.

Within the past five years, a family of foundry grade particulate reinforced MMCs produced by the dispersion process have become increasingly available. The most common of these is an aluminum-silicon alloy matrix that is homogeneously mixed with discontinuous silicon carbide particulates. Volume loading of reinforcement ranges typically between 5 and 20 percent. At the higher levels of particulate loading, the tensile properties and coefficient of thermal expansion can approach those of cast irons. With strengths that are similar to those of cast irons, a comparable part can be produced with less than one half the mass, with upwards of three times the thermal conductivity and significantly increased abrasion resistance. The properties of this family of materials suggests a wide range of commercial applications; especially in areas where weight reduction is advantageous.

From the perspective of Metallurgical Engineering, net shape casting practices offer one of the most versatile means of controlling microstructure and material property development. This statement is especially true for particulate reinforced MMCs, where the type and loading of the reinforcement material chosen has a distinct influence on the overall material properties. This family of composites have the potential of allowing the engineering of a specific part to meet a range of mechanical requirements through control of reinforcement loading within the piece, as well as the selection of the matrix alloy employed. This type of reinforcement loading control has typically been achieved through the use of reinforcement preforms or by powder metallurgy processes, though neither of these manufacturing routes lend themselves to the economies of general foundry practice.

Clearly, it would be desirable to provide a new process that permits the production of complex cast particulate MMC parts with controlled gradients of reinforcement, suitable to the standard foundry environment. The cost or complexity of currently available approaches to produce complex parts from composite materials does not offer any acceptable solutions to this problem.

SUMMARY OF THE INVENTION

In accord with present invention, a method is defined for casting an object in a mold from a composite material. The method includes the step of at least partially filling the mold with a mixture of a first material that is a liquid and a second material that is a solid. Either the first material or the second material has a greater density than the other. The mold is then rotated about an axis of rotation for a time interval. The rotation produces a centrifugal force that tends to cause the material with the greater density to move away from the rotational axis, creating a greater concentration of that material nearer a periphery of the mold than adjacent to the axis of rotation. The mixture is solidified, forming the composite material having a shape defined by the mold.

The solid provides reinforcement to the composite material which increases as the volume percent of solid particulate or short fiber increases. The method further includes the steps of removing a portion of the composite material that is adjacent to the axis of rotation, leaving a remainder of the composite material. If the concentration of particulate reinforcement is greater in the remainder, the remainder will be stronger and have enhanced properties relative to the portion removed and can be further fabricated to produce a part or other object of interest. Conversely, if the concentration of the particulate reinforcement is greater adjacent to the axis of rotation, the portion that is removed will be stronger and have enhanced properties relative to the remainder and will be used for the desired product of the process.

This method is applicable to producing an aluminum-silicon/silicon-carbide alloy and a magnesium/boron-carbide alloy, as well as a polymer filled with particulates. By using centrifugal force to disperse the reinforcement particulates in the composite material, relatively complex shapes can be produced in a mold, even when a portion of the shape is shadowed by another portion. Furthermore, the method enables the concentration of reinforcement particulates to be made much higher than with other techniques, thereby producing shapes that have desirable properties compared to those made with conventional techniques.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 displays an embodiment of a system for centrifugally casting an object using an MMC;

Figure 7A:
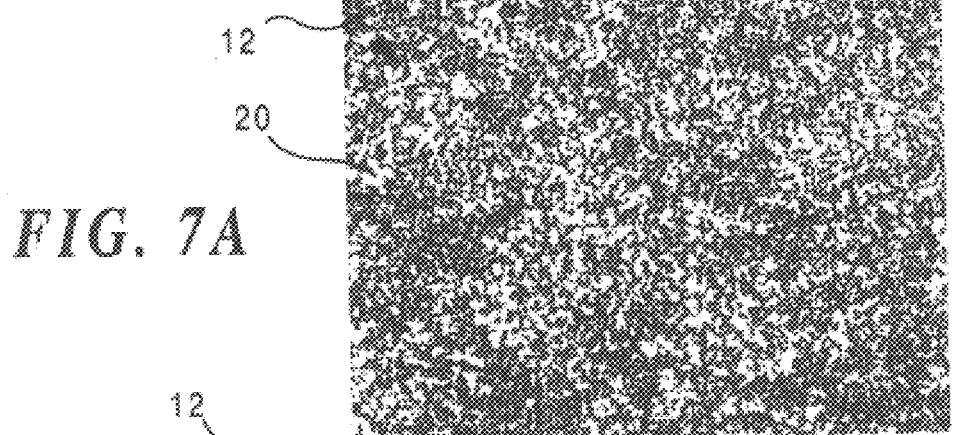
FIG. 7A is a photomicrograph showing a cross-sectional view at 50 times magnification of an outer region at the periphery of a functionally gradient Al-Si/SiC particulate disk that was centrifugally cast at 700 rpm.
Figure 7B:
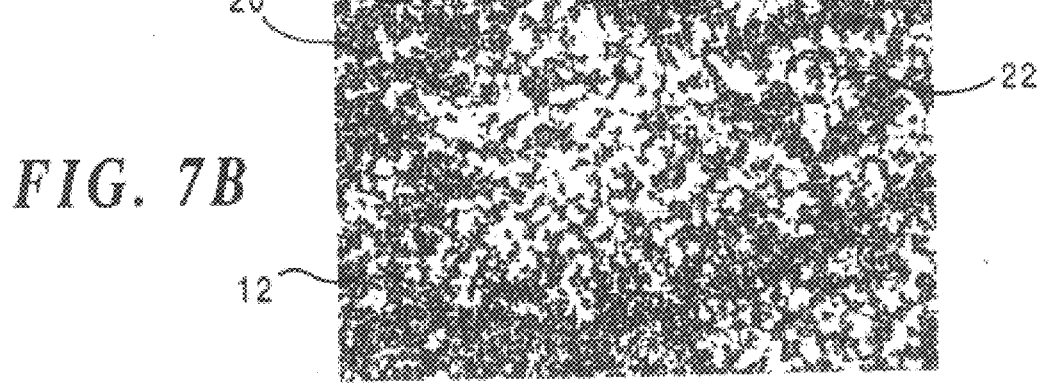
FIG. 7B is a photomicrograph showing a cross-sectional view at 50 times magnification of an outer region of a functionally gradient Al-Si/SiC particulate disk that was centrifugally cast at 700 rpm.
Figure 7C:
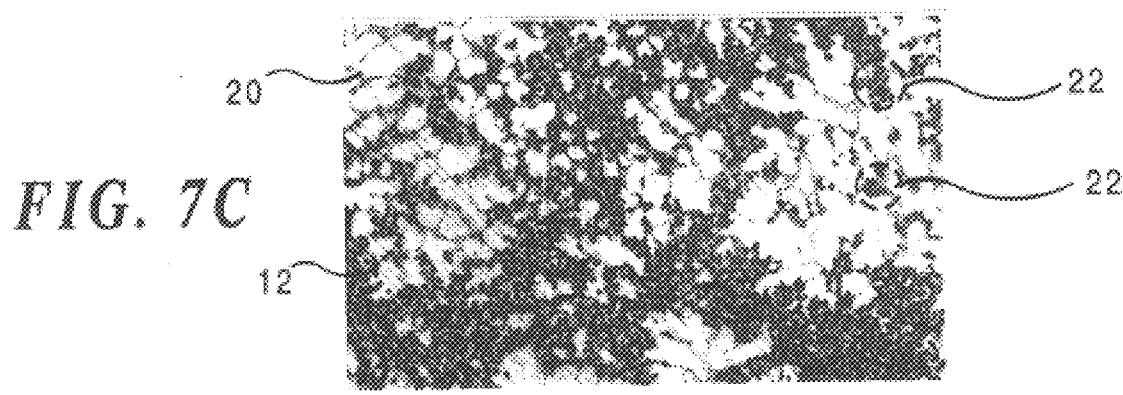
Figure 7D:
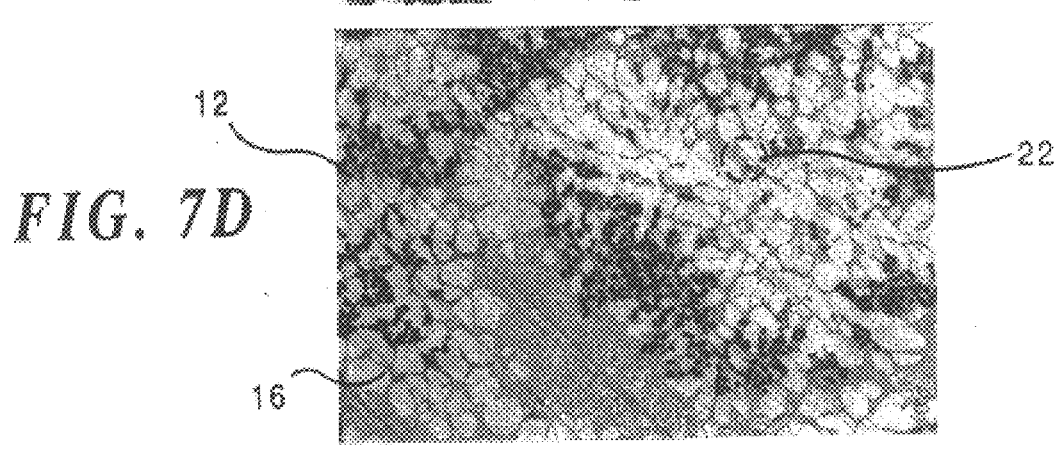

FIG. 7C is a photomicrograph showing a cross-sectional view at 50 times magnification of an interior region of a functionally gradient Al-Si/SiC particulate disk that was centrifugally cast at 700 rpm, which is equivalent to a static cast Al-Si/SiC 20 volume percent particulate disk; and FIG. 7D is a photomicrograph showing a cross-sectional view at 50 times magnification of an inner region of a functionally gradient Al-Si/SiC particulate disk that was centrifugally cast at 700 rpm.

DESCRIPTION OF THE PREFERRED EMBODIMENT

As noted above, the addition of microscopic particulates or short fibers to a matrix of polymer or metal can greatly increase material properties such as dimensional stability, thermal conductivity, tensile and shear strength, bending strength, rigidity, and wear resistance over that of the original matrix material. For most composite material systems, increasing the volume fraction of reinforcing particulate or short fibers provides a concomitant increase in the overall mechanical properties of the material. The present invention provides a method for increasing the volume fraction of reinforcing particulate or short fibers beyond that achievable for certain types of composites using prior art techniques. The method is applicable to cast composite systems that include polymer and metal matrix materials, reinforced with ceramic particulates, platelets, or short fibers. The polymer matrix materials include both thermosets and thermoplastics, such as polyesters, polyimides, phenolics, epoxies; polyetheretherketones (PEEK), and NYLONs. Each type of polymer matrix material may be reinforced with particulates, platelets, whiskers, or short fibers of silicon carbide, alumina, tungsten carbide, or graphite.

Metal matrix materials that are usable in practicing the present invention include alloys of aluminum, magnesium, copper, zinc, iron, nickel, and titanium. These materials can be combined with reinforcements of particulates, platelets, whiskers, or short fibers, including silicon carbide, boron carbide, titanium carbide, silicon nitride, alumina, graphite, or combinations thereof.

Utility of Metal Matrix Composite Materials

The motivation for the use of cast particulate reinforced MMCs is the potential for significant improvement in specific strength, specific stiffness, and wear resistance. At higher levels of reinforcement, there is also marked improvement in thermal expansion and thermal conductivity relative to conventional foundry alloys. In particular, the Al-Si/SiC family of particulate reinforced MMCs offer mechanical properties that are superior to those of most cast aluminum alloys, and comparable to those of cast irons and alloy steels. Table, 1, provided below, gives a comparison of typical material properties for two standard casting alloys and three MMC alloys with increasing levels of ceramic reinforcement. The standard alloys are a ductile cast iron and an A356-T6 aluminum alloy. The first two MMC alloys are a hypoeutectic 359 aluminum alloy that is homogeneously mixed with 15 $\mu$m diameter silicon carbide particles. The third MMC alloy is a 2000 series aluminum alloy that is homogeneously mixed with silicon carbide particles that have diameters that range from 10 to 100 $\mu$m in diameter.

The properties given in Table 1 show that at increasing particulate loading (i.e., higher percentages of SiC), the Al-Si/SiC metal matrix composite materials begin to offer unique design advantages over the more conventional casting alloys. The general result of increasing the particulate loading is increased strength and modulus and a corresponding decrease in elongation and coefficient of thermal expansion. The overall wear resistance and thermal conductivity are also seen to increase with increasing SiC particulate volume percent.

The manufacture of high strength, and quality, cast Al-Si/SiC particulate reinforced MMC components is affected by a number of parameters. These include the level of reinforcement, particle size, microstructure development, matrix alloy selection, and control of the distribution of particulate reinforcement within a specific part. Each of these factors contribute to the range of engineering applications that can be met with the Al-Si/SiC particulate family of MMCs.

The most basic parameter in defining the mechanical properties of a castable MMC is the volume percent of particulate that can be carried in a melt without significant loss of fluidity. The viscosity of a standard aluminum casting alloy, such as an Al-Si A356, is similar to that of water. At casting temperatures common for most matrix alloys, the reinforcement particulates remain in a solid state. An increase in the percentage of solid particulates causes a corresponding increasing loss of fluidity in the composite melt, to the point that complete mold filling and detail replication becomes a problem. Research conducted with a wide range of particulate reinforced MMC alloys has shown that for most common conventional casting processes, the maximum volume percent of particulate reinforcement that can be carried by an aluminum alloy matrix, without appreciable loss of castability, is approximately 20 percent by volume.

It has also been observed that particulate size has an impact on overall melt fluidity. For a given volume percent loading of particulate, a relatively smaller particle size has the effect of raising the composite melt viscosity. Particle sizes that are typically used in the commercially available castable particulate reinforced MMC alloys range between 3 $\mu$m and 30 $\mu$m, with a nominal diameter of 15 $\mu$m being the most common. It should also be noted that for a given loading of particulate, the use of a smaller particle size typically yields greater mechanical strengths.

TABLE 1

Comparative Material Properties

|  | Ductile Cast Iron 350/140 | A356-T6 Aluminum Base Line Alloy | A359-T6 Aluminum 20 vol. % SiC | A359-T0 Aluminum 54 vol. % SiC | 2000 Series Aluminum 68 vol. % SiC |
|---|---|---|---|---|---|
| Density (lb/in$^3$) | 0.257 | 0.0970 | 0.0999 | 0.108 | 0.110 |
| Ultimate Strength (ksi) | 33 | 40 | 52 | 56 | 31 |
| Yield Strength (ksi) | 31 | 29 | 49 | 55 | — |
| Specific Strength 10$^5$ in | 1.28 | 4.12 | 5.29 | 5.19 | 2.82 |
| Elastic Modulus (Msi) | 24.5 | 10.9 | 14.3 | 27.0 | — |
| Specific Stiffness (10$^8$ in) | 0.95 | 1.12 | 1.43 | 2.50 | — |
| Elongation (%) | 0.8 | 6.0 | 0.4 | 0.2 | — |
| Coef. Thermal Expansion (10$^{-6}$ in/° F.) | 6.94 | 11.9 | 9.7 | 6.8 | 4.2 |
| Thermal Conductivity (BTU/ft/hr/° F.) | 20.7 | 92.0 | 112.0 | 122 | 128 |
| Wear Resistance (Volume Loss 10$^{-6}$ in$^3$) | 4.0 | 11.5 | 1.5 | — | — |

The quality of a particulate reinforced MMC part is also determined by the microstructure that is developed as solidification takes place in the final casting. As with any hypoeutectic aluminum casting alloy, the microstructure is dictated by the cooling rate during solidification and the resulting dendritic arm spacing. For parts that are cast to near net shape, the choice of casting route most commonly dominates the rate at which solidification takes place. Of the typical casting routes, investment casting generally exhibits a relatively slow cooling rate, with a large dendritic arm spacing, as opposed to permanent mold or steel die casting, which produces a relatively fine microstructure with small dendritic arm spacing. Sand casting and lost foam process generally show cooling rates and arm spacing that fall between the investment and permanent mold casting routes. In the case of particulate reinforced MMCs, under conditions of relatively slow cooling, such as is typical of investment or sand casting, the SiC particulates are segregated into the interdendritic regions by the growth of the α phase Al dendrite structure. The resulting microstructure can be quite non-uniform, with distinct regions of particulate free α phase Al and particulate rich interdendritic regions. Under conditions of more rapid cooling, such as permanent mold and die casting, the distribution of particulates becomes much more uniform due to the much smaller dendritic arm spacing.

Figure 2A:
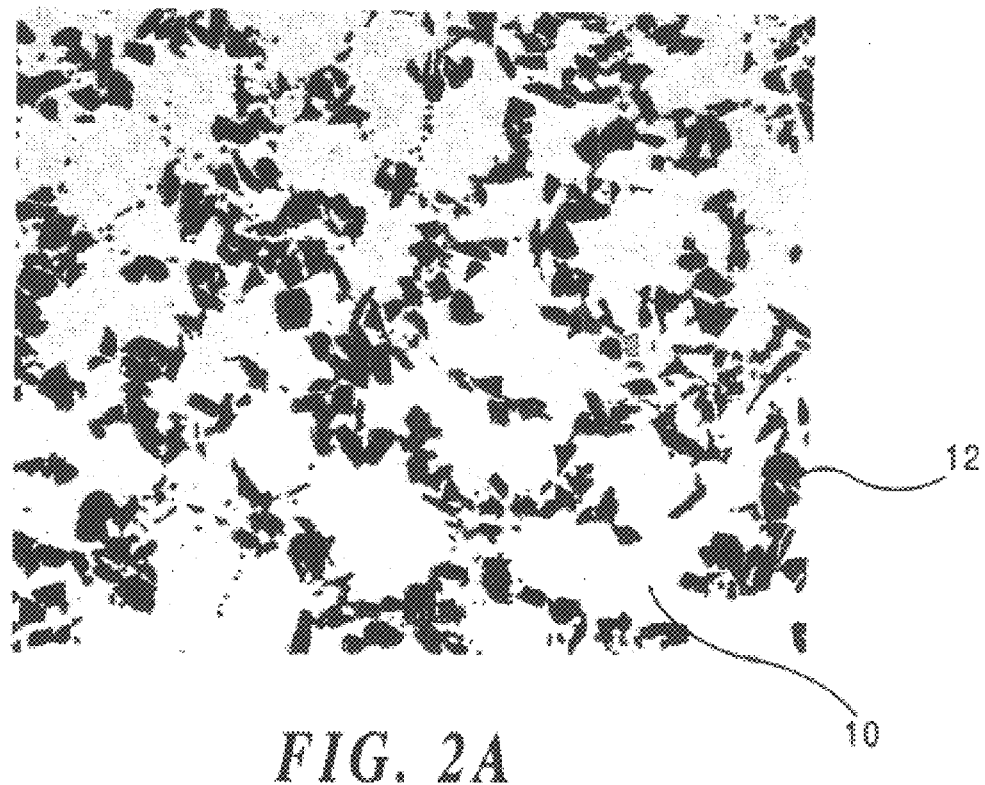
FIG. 2A is a photomicrograph showing the microstructure of a sand cast hypoeutectic Al-Si alloy that includes 20% by volume SiC particulates viewed at 250 times magnification.
Figure 2B:
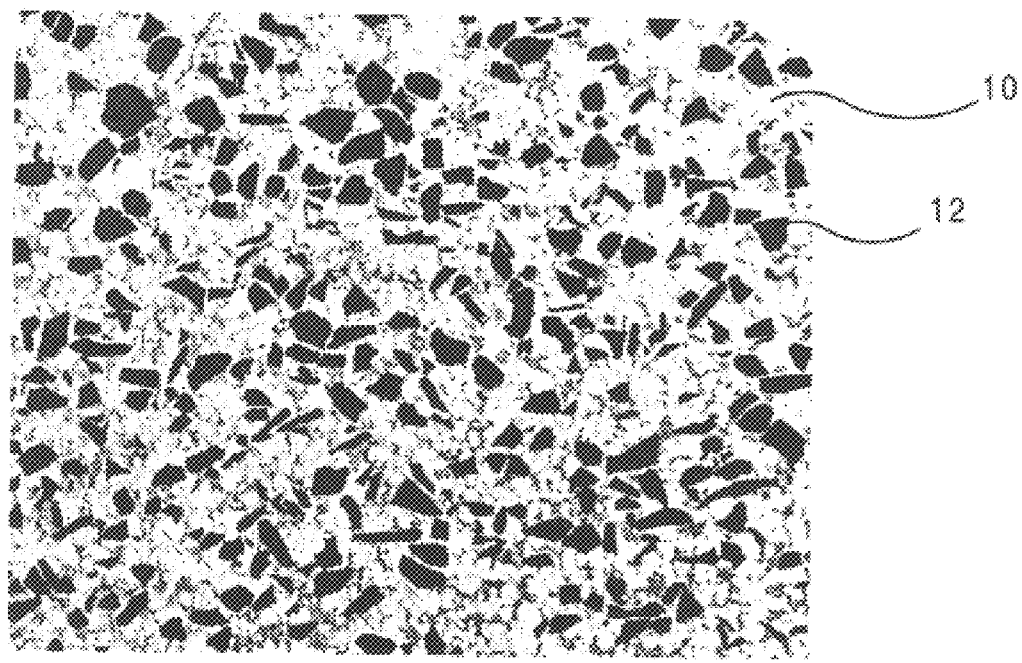
FIG. 2B is a photomicrograph showing the microstructure of a permanent mold cast hypoeutectic Al-Si alloy that includes 20% by volume SiC particulates viewed at 250 times magnification.

FIGS. 2A and 2B show the differences in microstructure due to differing cooling rates and dendritic arm spacing. (In these Figures and in FIGS. 3, 6A–6C, and 7A–7D, MMCs are shown that include A356 Al-Si alloy matrix 10 and SiC particulates 12.) It is noted that the defining factor between the two cases is the relative relationship between dendritic arm spacing and reinforcement particle size. For cooling rates that promote arm spacing greater than the particle diameter, distinct segregation can exist. For more rapid cooling rates, where the arm spacing is smaller than the particle diameter, segregation is more limited, and the overall microstructure is much more uniform. Eutectic and hypereutectic Al-Si/SiC particulate reinforced alloys show no significant difference in particulate segregation due to the differences in solidification structure.

Figure 3:
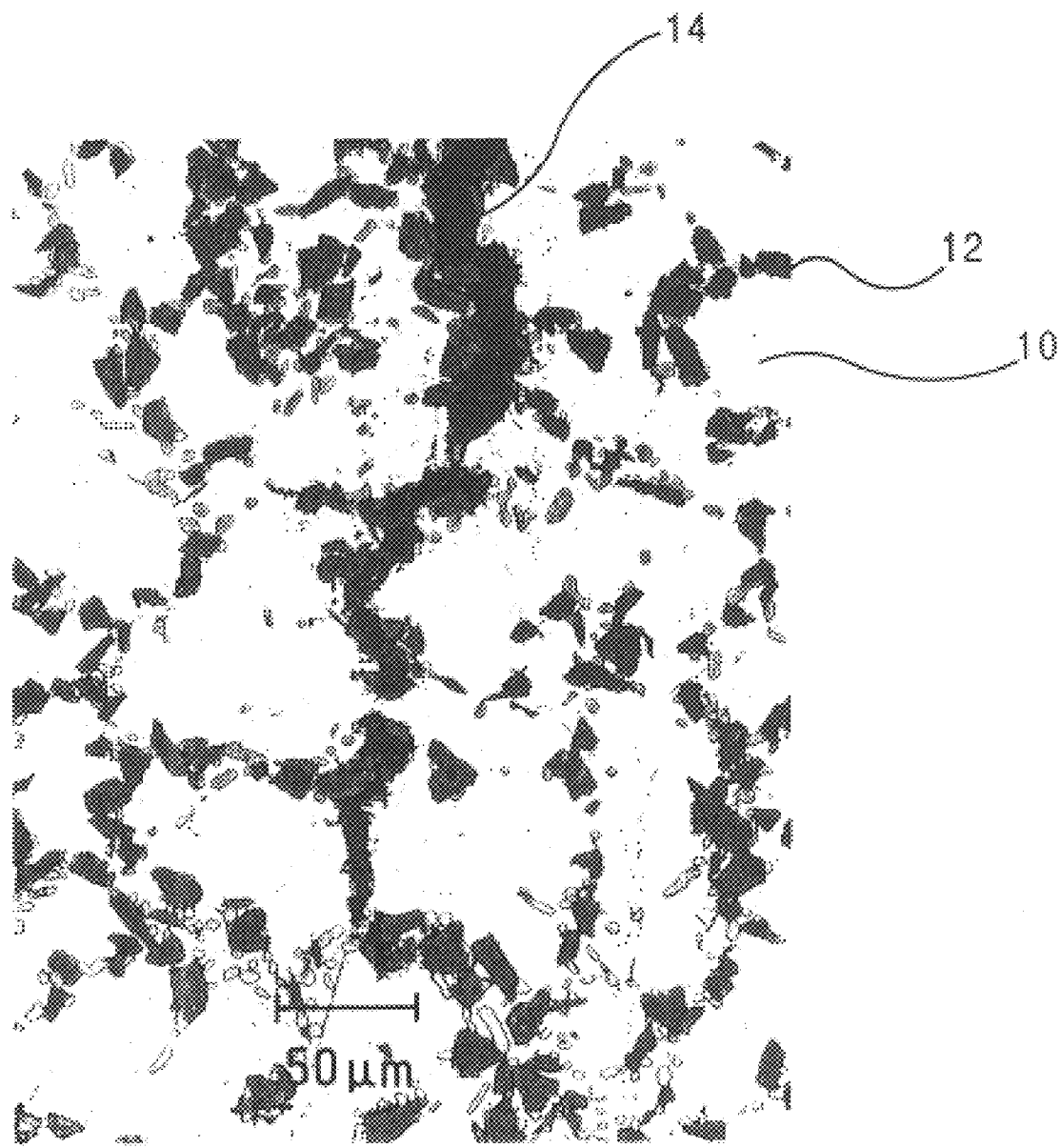
FIG. 3 is a photomicrograph showing crack propagation through a sand cast hypoeutectic Al-Si alloy reinforced with 15% by volume SiC particulates viewed at 250 times magnification.

In the case of segregated microstructures, in slow cooled hypoeutectic Al-Si/SiC particulate alloys, it has been seen that fractures tend to propagate through the particulate rich interdendritic regions. This phenomenon appears to be the result of the high degree of dislocation pinning in areas that make up a relatively large percentage of localized eutectic silicon. The hard, brittle nature of the β Si does not as easily allow crack tip blunting compared to the surrounding unreinforced α Al dendritic structure. This trend can be further exacerbated by gasses that are entrapped in the composite melt during remelting and casting. Gas bubbles tend to be held in suspension by the reinforcement particulates and become concentrated within the interdendritic regions upon solidification. FIG. 3 shows a typical crack 14 propagating through a sand casting comprising A356 Al-Si alloy matrix 10 reinforced with 15 volume percent SiC particulates 12.

Alloy modification may also be used as an aid to the manufacture of cast Al-Si/SiC particulate MMCs. One of the most important modifications is the overall silicon content of the matrix alloy. The presence of carbides, most commonly SiC, in an aluminum melt can thermodynamically favor the formation of the intermetallic compound $Al_4C_3$, as indicated by the following equation:

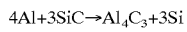

$$4Al + 3SiC \rightarrow Al_4C_3 + 3Si$$

Figure 4:
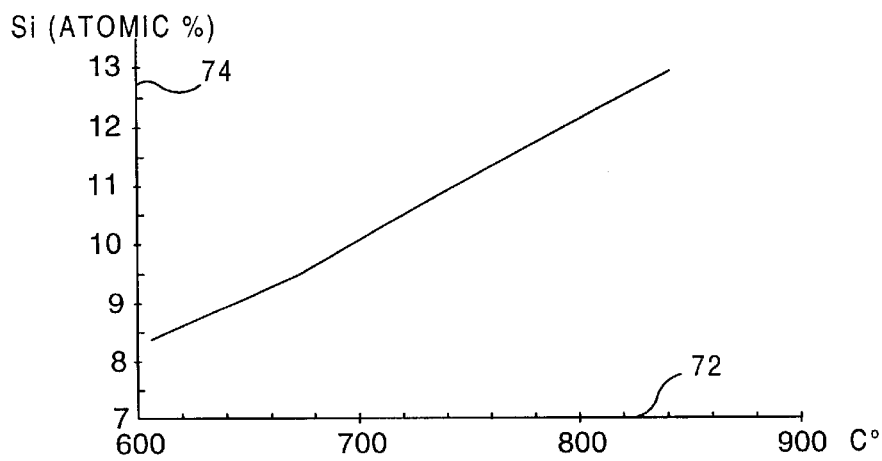
FIG. 4 is a graph illustrating the minimum Si atomic percent in an MMC that is required to suppress interfacial formation of $Al_4C_3$ on SiC, in an Al-Si/SiC MMC, over a range of casting temperatures.

Aluminum carbide is hydroscopic and leads to irreversible degradation of the composite melt. The results of excess formation of $Al_4C_3$ range from dramatic loss of melt fluidity and casting porosity to poor corrosion resistance due to the water soluble nature of the precipitates. The formation of aluminum carbide may be suppressed by establishing a silicon content in the matrix alloy that is in equilibrium with the given formation reaction, at a specific casting temperature. FIG. 4 shows a general thermodynamic estimation of the equilibrium Si content (atomic percent) along a vertical axis 74 for an aluminum matrix alloy required to suppress the formation of $Al_4C_3$, in the presence of SiC particulates over a range of casting temperatures, indicated along a horizontal axis 72.

Research has shown that for most foundry practices, the deleterious effects of $Al_4C_3$ formation can be avoided through the use of aluminum matrix alloys that contain between 8.50 and 12.50 weight percent silicon. A general purpose A359 Al-Si/SiC particulate composite alloy, with 8.50 to 9.50 wt. percent silicon, maintains good casting performances at melt temperatures up to a maximum of approximately 745° Celcius; above this limit, the rapid formation of aluminum carbide will irreversibly damage the composite melt.

At the foundry level of casting production, other alloy additions can be used to more effectively control the development of microstructure. In the case of Al-Si alloys, the addition of small percentages of titanium (Ti) and boron (B), and in some cases strontium (Sr), are effective. Ti and B act as nucleation sites within the melt to yield a finer grain structure. Additions of Sr are used to promote blunting of β phase Si during solidification. This type of silicon modification has proven to be effective in increasing the overall fracture toughness of both hypo and hypereutectic Al-Si alloys. The benefits of these secondary types of alloy modifications are significantly reduced when applied to particulate reinforced MMCs. The presence of a field of particulates in a melt provides a dominate influence on both the available nucleation sites, and the presence of angular shapes that may serve as crack initiators.

The body of the work done in the prior art on the development and evaluation of the performance of the Al-Si/SiC particulate family of MMCs has been centered on material that has a homogeneous distribution of reinforcement and isotropic mechanical and thermal properties. Due to the balance of properties that result from differing degrees of reinforcement in a composite, there are a large range of design motivations to apply a manufacturing process that can produce parts that have a graded reinforcement profile. Particulate reinforced MMCs that have variable or selective reinforcement have been produced by means of powder metallurgy, spray deposition, and a variety of preform infiltration processes. Each of these types of processes can yield a controlled distribution of particulate reinforcement; but they are not as economically attractive or as readily accessible as the more traditional foundry practices that can be used to produce cast MMC parts that carry a homogeneous particulate distribution. Accordingly, the present invention fulfills a requirement for a process enabling control over the distribution of reinforcement within a casting, that is also applicable to a standard foundry environment.

It has been observed that when casting SiC particulate reinforced Al alloy composites, settling of the particulates occurs during holding of the melt in a furnace or ladle. The differences in density between an aluminum matrix alloy and SiC reinforcement particulates is the basis for this settling behavior. The rate of settling has been described, by Stokes' terminal velocity law, where the settling velocity, $V_0$, of a single spherical particle in a continuous fluid medium is given by:

$$V_0 = \frac{d^2(\rho_S - \rho)g}{18\mu}$$

In the preceding equation, d is the diameter of the sphere, $\rho_s$ is the density of the particle, $\rho$ is the density of the fluid, $\mu$ is the viscosity of the fluid, and g is the acceleration due to gravity. The equation is only pertinent for spherical particles and very dilute solution with negligible particle interaction. For particulate loadings that are more consistent with that of particulate MMCs, i.e., with volume fractions greater than 10 percent, a modification to Stokes law has been proposed to account for reduced settling velocities due to particle and containment vessel interaction; the modification is given by:

$$V_p = V_0(1-f)^n$$

where $V_0$ is Stokes terminal velocity, $f$ is the volume fraction of spherical particles suspended in a composite melt, and n=4.65+19.5d÷D, d being equal to the nominal particulate diameter and D being equal to the diameter of the containment vessel. Additional expressions have been derived to describe the behavior of non-spherical particles and a range of particulate field behaviors. As is often the case, the fit of the various models applies most closely to the work from which it was derived. In actual application, the mathematical models typically only serve to establish parameters for basic behavior. The primary value of Stokes law, for the present invention, is to provide some understanding of the parameters of particulate settling, or flotation, driven by the differences in density between particulates and a surrounding fluid body under the influence of an acceleration.

Research has been performed on the settling behavior of silicon carbide particulates evenly distributed in a molten A356 matrix alloy. It has been observed that particulates (82 $\mu$m diameter) settled in a non-flocculating manner up to a maximum density of approximately 52 volume percent in a molten aluminum alloy, after passing through a region of intermediate densities. A typical settling sequence in a vessel under the influence of gravity begins with the original homogenous distribution of particulates settling downward. The settling causes a particulate-free zone to develop at the top of the vessel and a region of maximum particle density to develop at the bottom, with an intermediate region separating the homogeneous original particulate field and the region of maximum particulate density at the bottom of the vessel. As settling progresses, the region of maximum density increases in depth, and the original particulate fields become reabsorbed into the region of intermediate densities. At the conclusion of the settling progression, the vessel contains only a region of maximum particulate density and another region that is free of particulates.

Additionally, it has been observed that both particulate size and volume percent of particulates in the mix affect settling rates. A larger particle size, at low levels of reinforcement, shows the most rapid settling. The smaller particle diameters, at higher levels of reinforcement, require much longer holding times to achieve maximum settling. This observation is consistent with the behavior that would be predicted by versions of Stokes' terminal velocity law, although actual rates have been found to be much greater than those predicted by the modified Stokes' law. It has also been noted that the maximum volume percent of particulate density in a stabilized melt was related to particle size. Smaller particle sizes have resulted in a lower maximum density of the stabilized melt.

Some research has evaluated the use of an applied centrifugal acceleration to establish a functional gradient loading of particulates within a matrix material. The research showed that a dominant centrifugal force could be used as means for controlling an accelerated settling behavior. Mathematical models were suggested based on experimentally observed particulate loadings in a plaster and corundum composite system ($CaSO_4$ $2H_2O/Al_2O_3$ #60 grit grain size). The results of this research showed that the settling behavior under the influence of a centrifugal force was similar to that observed in the cases of standard gravitational settling.

To date, the bulk of research related to the casting of metal matrix composites has been based on existing technologies for the processing of homogenous materials. Currently, processes that incorporate controlled settling or centrifugally implemented casting are limited to utilizing centrifugal force to infiltrate a rigid reinforcement preform with a molten matrix alloy, in a closed mold and using centrifugal force to cast tubes, or other symmetrical shapes, with a particulate reinforced MMC, in an open barrel type mold. Reinforcement particulates are either homogeneously mixed with the melt or introduced separately at the time of casting. Significantly, the prior art does not address processing functionally gradient, or nonstandard distribution particulate reinforced MMCs, as provided by the present invention.

Research has shown that the properties of the Al-Si/SiC particulate family of MMCs is dominated by the level of particulate loading within a part. Further, the research has also provided an insight into the interaction of controls over solidification and microstructure development, as they apply to the casting of homogeneously mixed Al-Si/SiC particulate composites. However, to take full advantage of the design potential and economy that is available in the application of cast particulate MMCs, it is apparent that the present invention's utilization of centrifugal acceleration may be the most effective means of controlling particulate distribution for producing functionally gradient, or non-uniform reinforcement within a net shape cast part.

EXAMPLE 1

The first example evaluates the potential range of particulate distributions that may be generated by use of an applied centrifugal acceleration to a composite material in a closed mold. The range of particulate field distributions was modeled with a low temperature epoxy/SiC particulate material system.

The particulate distribution behavior was modeled using a low viscosity epoxy and silicon carbide particulates. The epoxy matrix was obtained from AD TECH Corp., No. CER-112-1, specific gravity of 1.09 grams per cubic centimeter, a viscosity of 600 to 650 CPS, and a gel time of 15 to 20 minutes at 20° C., clear color. The silicon carbide particulates were supplied by Superior Graphite Co., No. HSC 500, specific gravity of 3.15 grams per cubic centimeter, and a nominal diameter of 15 $\mu$m, dark gray in color.

Figure 1:
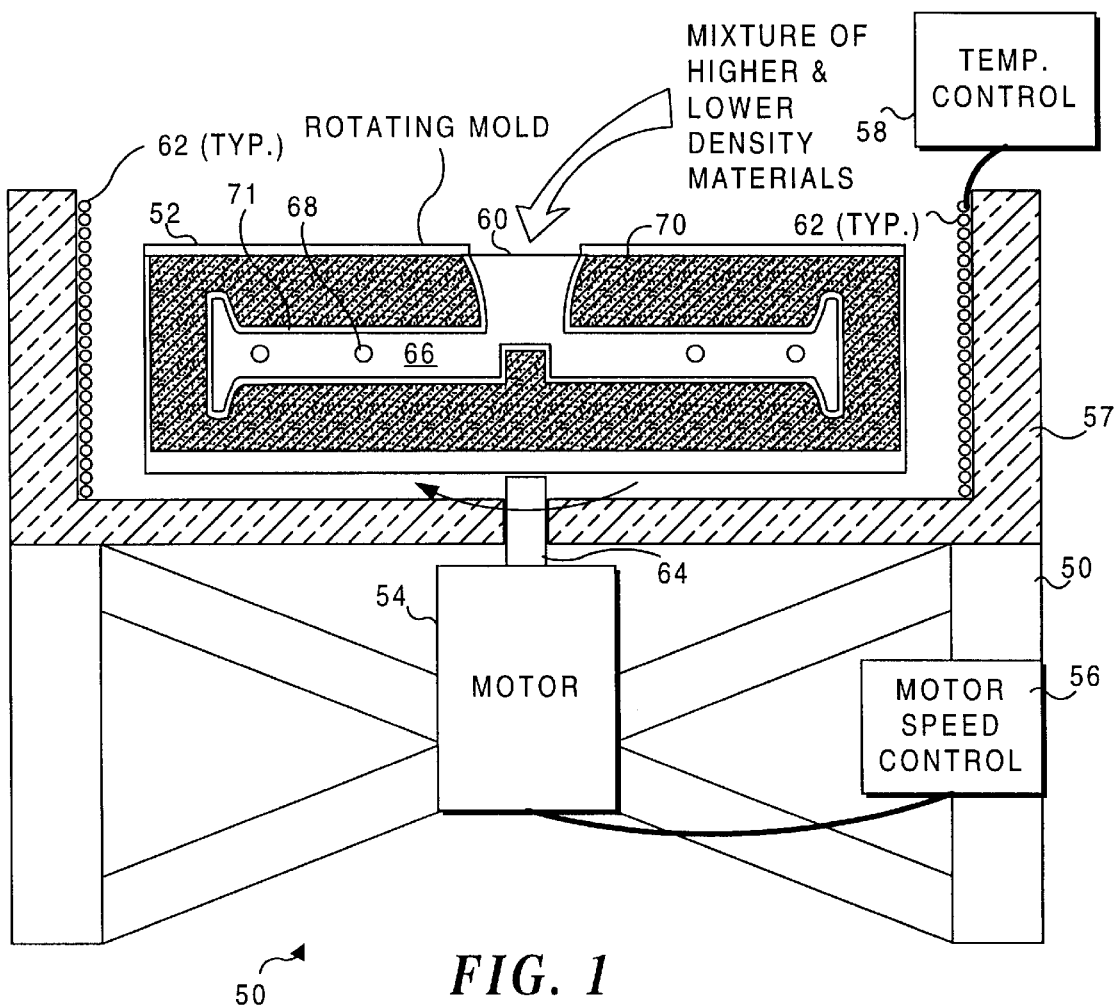

The potential range of particulate distributions was approached by casting disks of the epoxy resin and SiC particulates in a centrally rotating closed mold, and spinning until fully set. FIG. 1 shows the equipment and a mold casing 52 used for casting the epoxy/SiC particulate composite material (and for casting MMCs, as described below). A stand 50 supports an electric motor 54 having a shaft 64 that is coupled to a mold casing 52 so that the motor turns the mold casing about an axis of rotation that extends along the longitudinal axis of shaft 64; the rotation of mold casing 52 is indicated by the curved arrow in the Figure. A motor speed control controls the rotational speed of motor 54 and thus, the rotational speed of mold casing 52. In this embodiment, a ceramic shell 71 made by investment casting (e.g., lost wax technique) was supported in packed sand 70 within mold casing 52. Alternatively, another shape-defining medium of the type typically used for casting parts, such as a steel mold, can be used. The ceramic shell defines a mold 66 in which a part can be cast corresponding in shape to that of the mold.

Stand 50 also supports an insulated enclosure 57 that circumferentially encloses mold casing 52. A heating coil formed of resistance elements 62 lines the inner wall of enclosure 57 and is used to facilitate preheating mold casing 52 to a desired temperature. The temperature of the preheating process is controlled by a temperature control 58, which is coupled to the heating coil to control the electrical current supplied to it.

There were two techniques employed to cast the polymer matrix composite material. The first technique used was to partially fill the mold with epoxy resin, introduce SiC particulates through a throat 60, and spin the mold at a rate great enough to cause the particulates to be dispersed into the fluid body. In the second technique, the epoxy resin was homogeneously mixed with 20 volume percent SiC particulates, degassed, and the mixture then cast into the spinning mold. Multiple castings were made to determine a functional range of applied centrifugal force to establish an artificial settling of the particulate field. A two-part system epoxy resin was used, one part serving as a catalyst to harden the mixture as cast. (Thermoset and thermoplastic materials can be used that do not require a catalyst.)

For the epoxy/SiC material system, the set or solidification time was considered a constant and the applied centrifugal force was used as the primary processing variable. The centrifugal force was easily calculated based on the rotational velocity of the mold and the diameters of the cast disks. Once parameters for establishing a gradient particulate field distribution were determined for the epoxy/SiC material system and disk type part shape, the centrifugal casting process was applied to a complex two-dimensional part geometry. In FIG. 1, the complex shape of mold 66 is illustrated. A part having that complex shape was statically cast with a uniform mix of epoxy and 20 volume percent SiC particulate, then centrifugally cast again to evaluate the potential for achieving a functionally gradient particulate distribution.

EXAMPLE 2

The second example applied centrifugal casting to a commercially available Al-Si/SiC particulate reinforced metal matrix composite, followed by a verification of particulate distribution and microstructure development. The particulate reinforced metal matrix composite used for this study is an Al-Si/SiC alloy that is representative of the family of composites, which may be applied directly to conventional foundry remelt practices. The alloy was provided by Duralcan USA, and is currently available in commercial quantities under the product designation F3S.20. The alloy is similar to a 359 aluminum casting alloy reinforced with 20 volume percent silicon carbide particulates, with a nominal diameter of 15 μm. The balance of the chemical composition is given in Table 2, below.

TABLE 2

Chemical Composition of F3S Alloy

| | Si | Fe | Cu | Mg | Ni | Ti | Al | All others |
|---|---|---|---|---|---|---|---|---|
| F3S Alloy | 8.50–9.50 | 0.20 max | 0.20 max | 0.45–0.65 | — | 0.20 max. | Rem. | 0.03 max, 0.10 total |

Melt temperatures were maintained below 746° Celsius to prevent rapid formation of $Al_4C_3$, and subsequent irreversible damage to the composite melt. The application of centrifugal casting to establish control of particulate field distribution in the Al-Si/SiC family of composites was accomplished by casting sample disks under a range of applied centrifugal force and melt holding times. In the case of MMC materials, the processing variables expand to include the length of time the melt is held in a liquid state, as well as the applied centrifugal acceleration acting on the melt. Control of the melt holding time was accomplished by varying the temperature of the composite melt and the mold preheat. Again, multiple castings were made to determine a functional range of overheating and applied centrifugal force required to establish an artificial settling of the particulate field. Initial castings were made by heating the melt to a temperature just below the threshold for $Al_4C_3$ formation and increasing the mold preheat.

MMC samples were prepared by rapidly remelting foundry ingots and casting into a preheated closed steel mold. Both the remelting and mold preheating were done in electric resistance furnaces (not shown). Water cooling was applied to the periphery of the stainless steel mold to assist in establishing directional solidification in a radial direction, with solidification shrinkage confined to an inner diameter of the disks.

Results

Evaluation of particulate field distribution for both the epoxy/SiC particulate material and the Al-Si/SiC MMC in Examples 1 and 2 was carried out by optical microscopy and volume/density calculations, using specific gravity and the rule of mixtures.

Particulate Distribution

The first castings of the epoxy/SiC particulate composite material showed that a relatively high centrifugal force was required to cause the SiC particles to infiltrate the epoxy casting. Rotational velocities of approximately 2500 rpm were found to be effective for introducing the particulates into the fluid body from the interior diameter at throat 60. The centrifugal force generated by this rate of rotation was equivalent to a force of 488 times the force of gravity (488 g's) at the inner diameter where the particulates were introduced, and 776 g's at the periphery of the casting.

At this level of centrifugal acceleration, the particulates infiltrated the fluid body from the interior diameter of the casting, and artificially settled at the periphery of the mold. Particles added continued to infiltrate the fluid body until the epoxy began to gel; at this point, infiltration stopped or slowed to a negligible level. The settling profile upon solidification of the matrix showed a ring of high SiC particulate density at the outer edge of the disk with a sharp transition to the interior of the casting, which carried only trace amounts of particulates. The composite disk centrifugally cast with particulates introduced to the matrix from the interior of the mold exhibited a dark ring at the periphery of the casting, indicating a region of maximum particulate density, with a sharp transition to the interior of the disk, where only negligible amounts of SiC particles were evident.

Calculation of specific gravity of the material in the fully densified outer ring showed a uniform density of approximately 58 volume percent SiC particulate, with SiC particulates only comprising 7 volume percent of the total casting. Optical microscopy showed a uniform density of particulates in the outer ring with no apparent porosity; it was also noted that the particles present in the interior region of the disk were of relatively smaller nominal diameter compared to those in the fully densified outer ring.

Due to the high applied centrifugal forces required to establish accelerated particulate settling, and resultant internal mold pressures of over 830 KPa, (120 psi), severe mold fracturing was observed. Several designs were evaluated to arrive at one that would maintain integrity for the required processing loads and pressures.

After multiple trials, it was determined that there did not exist adequate control of particle introduction to the fluid body of the casting to develop a gradient particulate settling profile by means of infiltrating SiC particulates after the matrix had been poured. To achieve greater control of particulate distribution, disks were cast using a homogeneous mix of epoxy and 20 volume percent SiC particulates. It was found that particulate field settling behavior similar to that which has been observed in static conditions could be produced by varying the amount of applied centrifugal acceleration, with relatively constant gel times. With a gel time of approximately 20 minutes, samples were cast at a rotational rate of approximately 2200 rpm, (applied accelerations were 318 g's at the inside diameter, and 601 g's at the outer diameter). The particulate distribution in the solidified disk showed a region at the inner diameter that was devoid of particulates. Toward the periphery of the disk, particulate densities progressively increased to a region of maximum density. Evaluation of particulate density across a section of the disk, from the inner diameter to the outer diameter, by optical microscopy, showed that the region of maximum density had a relatively uniform distribution of SiC particles that gradually transitioned to intermediate densities toward the interior. The region at the periphery showed a particulate loading that was similar to the maximum found at the periphery of the disks cast at higher applied centrifugal forces. The interior region that was relatively devoid of particulates showed an abrupt transition to the regions of intermediate densities in the central region of the disk. The minimum particulate density, just outside of the interior denuded zone, was found to be approximately 8 volume percent; which was less than the initial uniform particulate density of 20 volume percent.

Figure 5A:
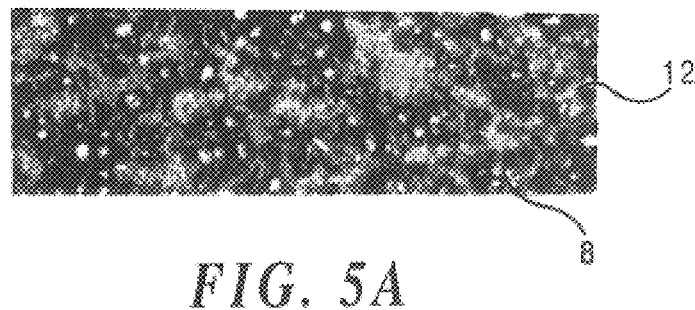
FIG. 5A is a photomicrograph showing a cross-sectional view of a static casting of epoxy/SiC 20 volume percent particulate disk displayed at 200 times magnification.
Figure 5B:
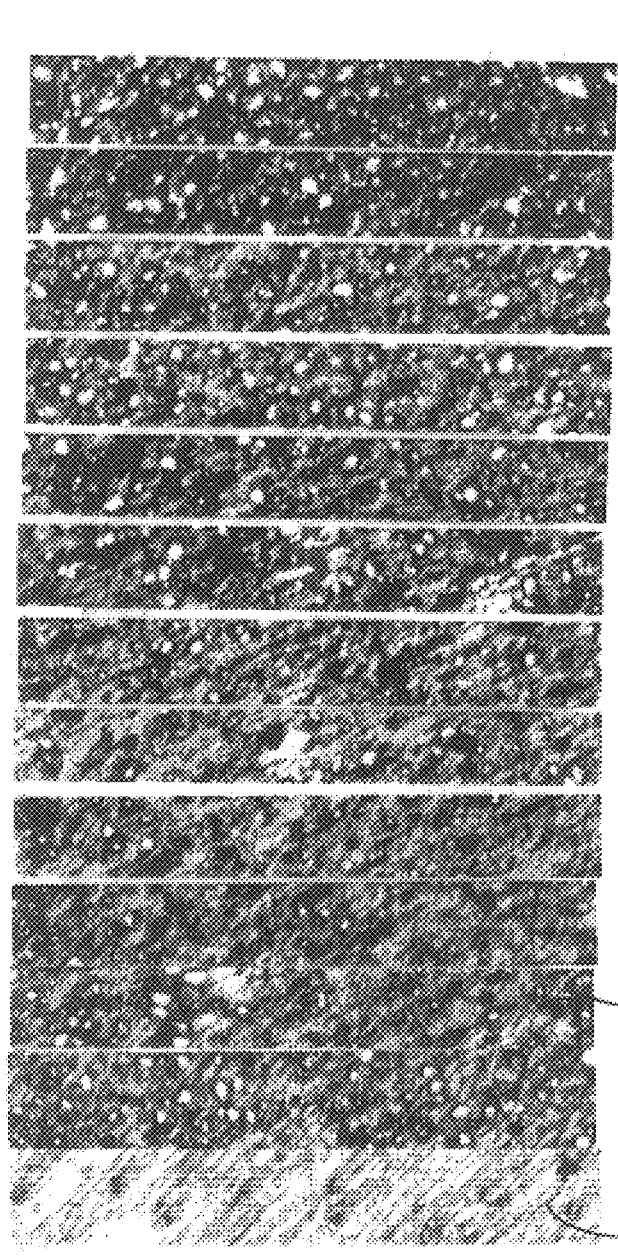
FIG. 5B is a photomicrograph showing a cross-sectional view at 200 times magnification of an epoxy/SiC 20 volume percent particulate disk that was centrifugally cast at 1500 rpm and which has a total section length of 55 millimeters.

Casting at a lower applied centrifugal force, using an initial uniform mixture of epoxy and particulates, resulted in a more evenly graded profile of particulate distribution. Sample disks were prepared from a homogeneous 20 volume percent SiC and epoxy mixture, and spun until fully set at 1500 rpm. This rotational velocity resulted in a range of applied centrifugal force of approximately 148 g's at the interior of the disk, to approximately 280 g's at the periphery of the disk. Evaluation of particulate field density across a section of the disk, from inner diameter to outer diameter, by optical microscopy, showed an artificial settling behavior that was less developed than the previous casting at higher applied accelerations. Both the region of maximum particulate density, at the periphery, and the interior region, that was relatively devoid of particles, were of smaller section thickness. Again, the outer region showed a maximum particulate density that was approximately equivalent to the 58 volume percent in the disks cast at higher levels of centrifugal acceleration. The transition to the central regions of intermediate densities appeared to be more gradual than those found in the castings produced at higher rotational velocities. At the interior, the region that was relatively devoid of particulates was of smaller sectional thickness, though a sharp transition in density of particles into the body of the disk was still observed. The particulate densities found adjacent to this denuded region were lower than the initial mix of 20 volume percent. FIG. 5B shows a cross section of a disk centrifugally cast at 1500 rpm. In this figure, particles 12 of SiC are shown in an epoxy matrix 8 at the indicated distances from the center of the disk, i.e., from 3 to 55 mm. It should be noted that the particles of SiC are not fully visible in their actual concentration in this figure, because they are partially obscured by the epoxy matrix. However, every light colored dot is a particle of SiC. For purposes of comparison, a cross section of a disk that was static cast from the mixture of epoxy and 20 volume percent SiC is shown in FIG. 5A. The images were produced by an optical analysis software program.

Evaluation, by optical microscopy, of the centrifugal casting made at 1500 rpm from the two-dimensionally complex mold showed that the web around the periphery of the part was fully densified. This included the sections of the web that were isolated from a direct path towards the interior of the part. Ribs that radiated out from the center of the part showed a graded profile of particulate density that was similar to that of the simple disk cast at the same rpm. Features 68 (see FIG. 1) that directly impeded the particulate field migration showed a high particulate density on the side that was toward the center of the part. These high density regions were triangular in shape, with a profile that gradually connected to a path outward into the part.

Particulate Distribution in Al-Si/SiC MMC

The first parameter to evaluate in producing a controlled artificial settling behavior in centrifugally cast particulate reinforced MMCs was the level of mold preheat and alloy superheat required to allow sufficient time for particulate field redistribution. It was found that a mold preheat temperature of 700° C. was sufficient to maintain the composite melt in a liquid state long enough for SiC particulate field settling. The temperature at which $Al_4C_3$ formation becomes thermodynamically favorable was the limiting factor in establishing the maximum composite melt temperature. The result of insufficient mold preheat was excessive cold shuts in the cast disks and incomplete mold filling due to premature solidification. The result of composite melt overheating was very rapid formation of $Al_4C_3$ and a subsequent drastic loss of melt fluidity. It was found that even short-term increases in melt temperature above the manufacturer's prescribed formation threshold would promote vigorous $Al_4C_3$ precipitation. A melt temperature of 720° C. in conjunction with a mold temperature of 700° C. was found to provide consistent casting properties and sufficient overheat to allow artificial particulate settling.

The applied centrifugal force required to promote an artificial particulate field settling behavior was found to be significantly lower than that required for the epoxy/SiC particulate system. The sixth casting attempt with an Al-Si/SiC particulate alloy yielded a disk that showed complete settling of the SiC particulates. Upon complete mold filling, the disk was centrifugally cast at 2000 rpm from a uniform melt of matrix alloy and 20 volume percent SiC particulates, and allowed to air cool for 90 seconds prior to water quenching the periphery of the mold. The applied centrifugal force at this rotational velocity was equivalent to 199 g's at the internal diameter of the disk, and 483 g's at the outer diameter of the disk.

It was noted that there was a distinct reduction in thickness (approximately 0.13 mm) of the disk at the transition between the outer region of full particulate density and the interior region that was devoid of particulates, due to the large difference in solid content at the time of matrix solidification.

Figure 6A:
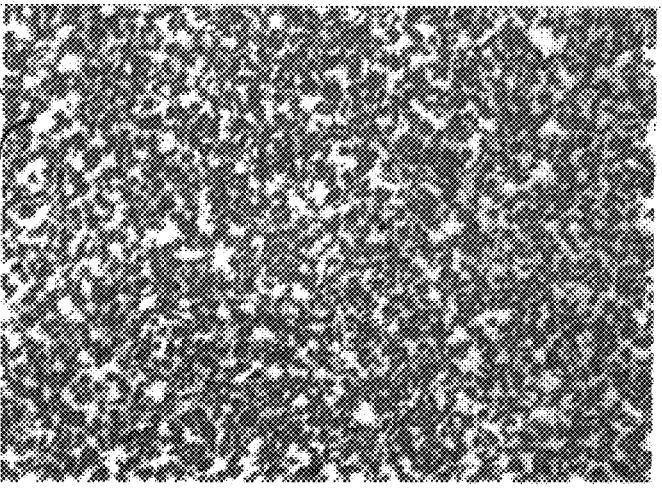
FIG. 6A is a photomicrograph showing a cross-sectional view at 100 times magnification of an outer region of an Al-Si/SiC particulate disk that was centrifugally cast at 2000 rpm.
Figure 6B:
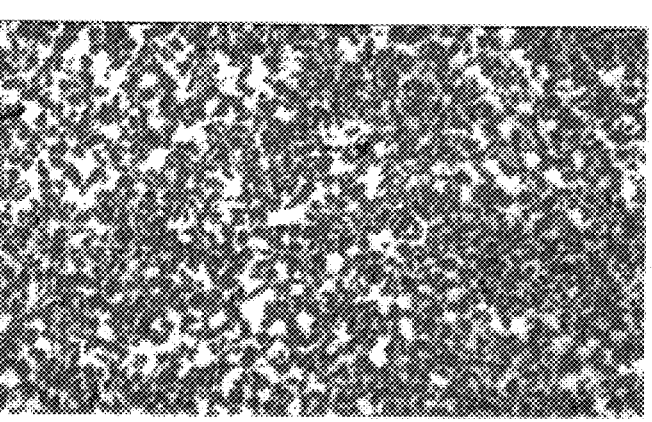
FIG. 6B is a photomicrograph showing a cross-sectional view at 100 times magnification of a middle region of an Al-Si/SiC particulate disk that was centrifugally cast at 2000 rpm.
Figure 6C:
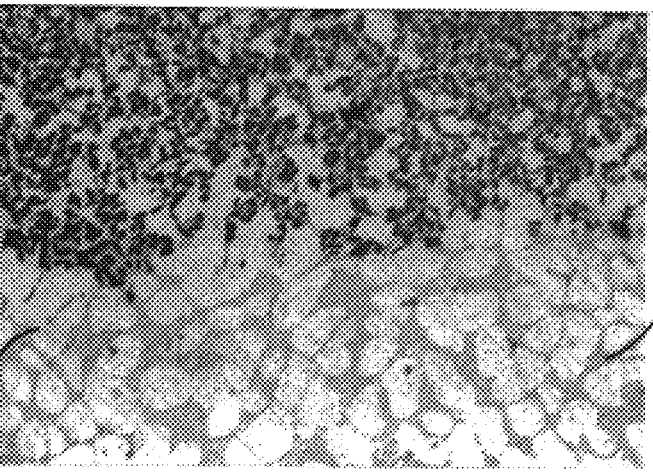
FIG. 6C is a photomicrograph showing a cross-sectional view at 100 times magnification of an inner region of an Al-Si/SiC particulate disk that was centrifugally cast at 2000 rpm and illustrates the transition from the particulate density to the denuded region.

Evaluation of a radial cross section of the disk by optical microscopy showed complete redistribution of the particulate field to the periphery of the disk. The transition between the outer region of high SiC particulate density and the interior, which was devoid of particulates, was extremely abrupt. The outer ring of high particulate concentration showed a relatively uniform SiC particulate density, with only a slight decrease in particulate density adjacent to the transition to the particulate denuded matrix interior. Calculations of specific gravity gave a particulate density of approximately 51 volume percent for the body of the region of high particulate density. A particulate density of approximately 46 volume percent was observed at the transition between the region of fully settled particulates and the interior of solely matrix alloy. FIGS. 6A–6C respectively show the outer region of high SiC particulate density near the periphery of the disk, a region at about the mid-radius with slightly lower SiC particulate density, and the transition to the denuded matrix alloy interior near the center of the disk. For comparison, FIGS. 2A and 2B respectively show photomicrographs of cross sections made of static castings of a sand cast hypoeutectic Al-Si alloy that includes 20 percent by volume SiC particulates and a permanent mold cast hypoeutectic Al-Si alloy that includes 20 percent by volume SiC particulates.

The microstructure of the interior region (top part of FIG. 6C) was typical for a cast, medium silicon content, aluminum alloy. A fully developed α Al dendritic structure 16 was observed, with Al-Si eutectic in interdendritic regions 18. In the region at the periphery of the disk that carried the high SiC particulate density (FIG. 6A), the dendritic structure appeared to be suppressed with a much finer structure that incorporated SiC particles 12 in regions 20 of both α Al and eutectic Al-Si.

Casting at a lower level of applied centrifugal acceleration and shorter liquid state holding time resulted in a functionally gradient distribution of particulate reinforcement. A disk centrifugally cast at 700 rpm, (centrifugal force of 21 g's at the interior diameter and 59 g's at the outer diameter), showed intermediate particulate settling, with a relatively even increase in particulate field density, from the interior of the disk to the exterior.

FIGS. 7A–7D show optical photomicrographs of a cross section of the disk cast at 700 rpm. These four Figures respectively illustrate the density of SiC particles near the periphery of the disk relative to regions 20 of α Al, in an outer region of the disk spaced away from the periphery, at an inner region spaced apart from the center of the disk, and at the transition between the denuded interior and the developing particulate field near the center of the disk.

The density of the particulate field is seen to increase in an approximately linear fashion, with a small interior region that was devoid of particulates to a maximum density at the periphery of the disk. The particulate density just outside of the transition from the interior denuded region was less than an equivalent static casting of the initial 20 volume percent SiC mixture. Calculations of specific gravity showed a maximum particulate density of approximately 41 volume percent at the outer diameter (FIG. 7A), and approximately 9 volume percent just inside the developing particulate field at the interior (top of FIG. 7D).

Similar to the previous disk cast at much higher applied accelerations, the microstructure of the interior region (FIG. 7C) was typical for a static cast, medium silicon content, aluminum alloy, resulting in a fully developed α Al dendritic structure with Al-Si eutectic in the interdendritic regions. In the region at the periphery of the disk that carried the maximum SiC particulate density (FIG. 7A), the dendritic structure appeared to be suppressed with a much finer structure that incorporated SiC particles in regions of both α Al and eutectic Al-Si. In the regions of relatively low particulate density, it can be seen that the dendritic arm spacing was greater than the particle diameter and that the SiC particulates were rejected to interdendritic regions 22 during solidification, resulting in an overall non-uniform microstructure. As the particulate density increased, the αAl dendritic structure appeared to be suppressed, with SiC particles being incorporated in the regions 20 of α Al and Al-Si eutectic.

The overall results show that centrifugal casting can be used to promote artificial settling of particulates in a fluid body. The particulate field profile that was developed by applying a high degree of centrifugal acceleration, with an outer region of maximum particulate density and a denuded interior, is analogous to the condition of complete static settling. The particulate field profiles that were developed with functionally gradient densities are again analogous to intermediate static settling profiles.

The fully densified outer region is the result of containment of the casting, both centrifugal and static. Particulates moving through a fluid body, under the influence of an acceleration, stack up against a feature that impedes their propagation. It appears that the maximum density that results is a combination of geometric packing density, based on particle geometry, and the applied force that drives the settling. As a particulate field compacts to a maximum density, there is a balance of forces established between the force of settling and the force required to displace the fluid matrix between the particulates. This balancing condition is one of the parameters that contributed to the difference in maximum density seen between the MMC disk cast under the ranges of applied centrifugal accelerations of 199 to 483 g's and 21 to 59 g's.

The principle difference between cases of static settling and those induced by centrifugal casting is the acceleration that acts on the particulate field within a fluid body. In the case of static casting, the only applied acceleration is that of gravity, with equal application to the whole of the particulate field. For centrifugal casting, the force of acceleration that acts on the particulate field varies with the radial distance from the axis of rotation. The result is a thinning of the particulate field in an unconstrained fluid body. This effect was seen in the disks that were prepared from a uniform mixture of particulates and matrix, and centrifugally cast to establish a functionally gradient profile of particulate densities. At the interior of the parts where a denuded region transitions to that of gradually increasing particulate density, the volume percent of particulates was lower than that of the initial mixture. The effect of this differential applied acceleration is also evident in the lack of clear transitions in developing intermediate densities. Previous works with static settling of particulate fields showed that there were clear transitions between settling regions of the original homogeneous mixture and regions of intermediate densities, and again at the interface between the intermediate densities and the region of maximum density found at surfaces that impede or contain the particulate field. The differential in applied acceleration, by centrifugal casting, across the section of the part appears to be fundamentally responsible for the relatively smooth transitions in particulate density compared to that which has been observed in static castings of particulate reinforced composites. This observation also suggests that settling behavior, which more closely matches that of static casting, may be found in part shapes that allow for a smaller differential in applied centrifugal acceleration, such as parts with a relatively small section thickness between inner and outer diameters. In such parts, centrifugal casting may develop a substantially homogeneous distribution of the reinforcement particulates.

Interference between particles at increasing particulate densities also contributes to the settling behavior observed in both centrifugal castings and prior art work evaluating static settling. As the particulate density increases, the rate of settling slows due to interactions between particles. This condition has been modeled by variations to Stokes' original law of particle sedimentation. The observed result, in the prior art for static settling, has been the development of the regions of intermediate densities between that of the original mixture and the particle enriched region along a containing surface. In centrifugal casting, particulate interference and the resulting impediment to the overall particulate field migration are the dominant factors in the development of a gradient profile of particulate density.

The effect of particle interference was also seen in the case of the epoxy disks centrifugally cast (Example 1) to promote particulate infiltration from the interior of the part into the fluid body. It was observed that only a small fraction of the available particles were infiltrated into the fluid body, even under conditions of relatively high applied centrifugal accelerations. Surface tension and viscosity of the fluid also were limiting factors, yet given the processing parameters, the rate of particulate infiltration was most likely dominated by particulate interference.

The centrifugal casting made in the two-dimensionally complex shape showed that a functionally gradient profile of particulate reinforcement could be developed, with increasing density developing along the radial direction outward from the center of the part. The outer webs that were not directly open to the interior body of the part showed a level of particulate densification that appeared to have resulted from particulate field compression and sedimentation from the interior region. The consistently high particulate densities at differing radiuses along the periphery of the part suggests that there is a level of particulate flow, which allows particulate migration around details that impede sedimentation strictly in the direction of the applied acceleration. The extrapolation of this conclusion suggests that centrifugal casting could also be used to developed a gradient profile of particulate densities in three dimensionally complex shapes.

The centrifugal acceleration that is applied to a particulate composite casting is only one of the distinct processing variables that can be controlled to develop differing particulate distribution profiles. The length of time that the matrix body is in the liquid state is the other principle factor in defining the particulate profile developed. The combination of applied centrifugal acceleration and time to solidification was determined in combination to develop the desired range of particulate field distributions. The solidification time in the epoxy/SiC material system was primarily determined by the rate of polymer cross linking, at room temperature, for the particular epoxy system. To achieve a desired particulate density profile, under a fixed applied acceleration, it is contemplated that a polymer system having a tailored rate of solidification can be employed for centrifugal casting.

In the case of the Al-Si/SiC MMC alloy, the time that the melt was held in the liquid state was primarily determined by the amount of overheating put into both the mold and the melt, and the cooling rate of the mold after casting. The processing parameters that were arrived at for the differing particulate density profiles are unique to the mold and MMC alloy used.

The amount of melt overheat possible and the corresponding time in the liquid state are determined by the maximum melt temperature that can be sustained prior to achieving the thermodynamic equilibrium that promotes the precipitation of $Al_4C_3$ for a given alloy. Some of the initial centrifugal casting attempts showed that the formation of $Al_4C_3$ has very significant detrimental effects on the casting properties of the melt. It was found that in an attempt to achieve a maximum melt overheat, even short-term temperature excursions resulting from furnace cycling can cause irreversible damage to the melt from $Al_4C_3$ formation. Attention was also given to the level of preheat developed in the mold. For a given mold mass, the preheat temperature should be controlled to prevent excessive melt overheating after casting.

The microstructure seen in the Al-Si/SiC particulate alloy was dominated by the particulate field density. In typical static castings, the development of a dendritic structure during solidification rejects the SiC particulates to the interdendritic regions and results in a non-uniform local distribution of reinforcement particles. The centrifugally cast MMC disks showed a markedly different structure at increasing particulate densities, with a suppressed dendritic structure and increasing particle incorporation in α Al regions. In the case of the disk that was cast at relatively high applied accelerations, the local microstructure was much more uniform than what would be found in a static solidification. The dendritic structure that was developed in the denuded interior region serves as a good indicator of the dendritic arm spacing that would be typical throughout the cross section for the given solidification rate, assuming that water cooling of the mold periphery was applied after solidification had begun. The disk that was centrifugally cast to develop a functionally gradient profile of particulate loading showed the progression of dendritic suppression with increasing particulate density. Towards the center of the disk, the SiC particulate were segregated to the interdendritic regions. As the particulate density increases, the arm spacing remains relatively constant, but is gradually suppressed by increasing particulate density. The reasons for this appear to be two fold, assuming a constant cooling rate across the section. One cause is the maximum geometric packing density for the given particle geometry, and the second is the reduction of localized volume of solute to develop a dendritic structure. As localized solidification takes place, the SiC particles are rejected to the interdendritic regions to a level of maximum density, at which point the growth of the dendritic arm is suppressed or must incorporate the particles. The presence of increasing volume percent solids also limits the localized volume of solute available from which to form the primary solidification product, resulting in a dendritic arm spacing and volume that is dominated by available solute volume rather than cooling rate. The effect of solidification dynamics has an effect on the maximum particulate density that can be achieved under given conditions of applied acceleration and liquid state holding, as evident in the higher maximum densities found in the disks that were cast under higher applied accelerations.

In the overall balance of developing microstructure, the presence of a high density of relatively angular solids introduces a large number of artificial nucleation sites, which would contribute to the development of a finer dendritic structure. The presence of an increased density of SiC particulates also dominates any potentially beneficial contributions that typical alloy modifiers may lend to the developing of a solidification microstructure. At increasing particulate densities, the high number of artificial nucleation sites begins to outweigh small fractional additions of Ti or B. A high concentration of SiC particles also dominates the effects of blunting developing eutectic Si.

The uniform distribution of SiC particulates in the highly densified regions of the centrifugally cast MMC disks suggests a greater resistance to crack propagation than what has been observed in static castings. In static castings, cracks will propagate along the particulate rich interdendritic regions of the microstructure, where the relatively high volume percent of brittle eutectic Si limits the degree to which blunting takes place as the crack is opened. The high particulate density regions of the centrifugally cast disks show a finer dendritic structure, with a relatively more uniform distribution of ductile α Al and eutectic Al-Si.

The high particulate densities seen in the centrifugally cast disks are unique to the family of cast particulate reinforced composites. For static castings, particulate densities greater than approximately 20 volume percent result in a loss of melt fluidity that limits castability. The examples discussed above prove that centrifugal casting can be applied to develop particulate densities in a part that are greater than what could be achieved by conventional static casting of a premixed composite melt. Centrifugal casting enables the filling of a complex mold with a melt having a particulate loading that maintains good casting properties, but is spun to achieve the desired density profile of the particulate field within the part.

The porosity observed in the disk of Example 2 that showed a gradient particulate density across the section is due to the tendency of gas bubbles in the melt to attach to the SiC particulates. The result is that any gasses that are introduced to the melt by turbulence during mold filling or stirring of the melt are held in the melt and prevented from agglomerating and rising out of the melt. The level of porosity that was observed in the samples that were centrifugally cast appear to be strictly due to turbulence introduced to the melt during mold filling. This observation suggests that a gating and riser system, which minimizes cavity filling turbulence, is essential to producing high quality castings.

A result of centrifugal casting to produce parts with sharp transition in particulate density is resultant stress differentials generated by matrix shrinkage during solidification. The disk that was cast to a fully densified particulate field showed an obvious step between the denuded interior matrix alloy and the region of maximum particulate density. Without particulate reinforcement, the interior was allowed to freely decrease in volume as solidification took place. The matrix alloy in the outer region that carried approximately 50 volume percent solid particulates, at or near a maximum packing density, was restrained from shrinking by the surrounding particulate field. This differential can impose a high degree of solidification stress in the overall part and between regions of greatly differing particulate density. The disk that carried a gradient profile of particulate densities would have a more even distribution of solidification induced stress.

Centrifugal casting can produce cast particulate reinforced composite alloys with regions of significantly greater particulate density than can be achieved by any of the more conventional static casting processes. Centrifugal casting of the Al-Si/SiC family of MMCs can produce parts with regions of greater than 65 volume percent SiC particulate reinforcement with a uniform local particulate distribution and a significantly suppressed dendritic microstructure.

As noted above, the results of the early experiments applying the present invention suggested that centrifugal casting can be used to develop a gradient profile of particulate distribution in three-dimensionally complex parts, as well as, two-dimensionally complex parts. To test this proposition, a Wankel engine rotor, which is an asymmetrical, extremely complex three-dimensional part incorporating a substantial interfering structure, was successfully centrifugally cast using the equipment shown in FIG. 1. Even though the interfering structure was required in the mold, the rotor was fully formed with all required casting detail, indicating that shadowing by internal portions of the mold was not a problem. Further, the desired higher concentration of structural particulates was achieved adjacent the periphery of the rotor, where it is most required. The rotor was substantially lighter, though of about the same or greater strength as a conventional cast iron rotor.

The advantages of enhanced strength and other mechanical characteristics in a part of relatively lower weight than one produced using non-composite materials were also achieved to great benefit in a disk brake rotor that was cast of Al-Si/SiC particulate alloy. In this application, as will be true of many other applications of the present invention, the interior portion of the cast rotor, in which the particulate reinforcement was relatively less than desired, was machined away, leaving only the radially outer portion of the disk casting. The concentration of the SiC in this remainder had an increasing gradient towards the periphery, but even at its inner edge, the concentration of SiC was substantially greater than the 20 volume percent in the original composite material added to the mold. Thus, it should be relatively straightforward to design molds, so that a portion of the mold object from which the reinforcement particulates have been depleted will be removed, leaving a remaining portion of the cast part in which the concentration of the particulates has been enhanced.

In the examples discussed above, the particulates added were characterized by being of relatively greater density than the matrix material to which they were added. However, it is also contemplated that the particulates may be of relatively lower density than the matrix material. For example, if SiC particulates are mixed into a melted stainless steel, and the resulting composite mixture is centrifugally cast, the relatively lighter SiC will become more concentrated nearer the axis of rotation, while the stainless steel concentration will be greater nearer the periphery of the mold. In this instance, the portion of the stainless steel in which the particulate concentration is below a desired level can be removed, leaving a remainder of the composite material nearer to the axis of rotation of the mold in which the concentration of the reinforcement particulates is greater and above the minimum desired level. This remaining portion of the cast composite matrix would then comprise the part that would be used.

The particulates added in both of the examples discussed above were of SiC. However, the present invention is also applicable to composites that comprise other types of particulates, including those made of silicon carbide, alumina, boron carbide, titanium carbide, boron nitride, silicon nitride, aluminum nitride, zircon, zirconium carbide, zirconium diboride, and graphite. The particulates may be generally spherical in shape, but particulates having a relatively large aspect ratio (length/width or diameter) such as particles shaped like whiskers, or short fibers, are generally preferable for reinforcements. Also, the particulates may be of generally the same size or of different sizes. Furthermore, other types of matrix materials can be used besides aluminum alloys and polymers, such as magnesium, titanium, and various types of steels, such as stainless steels or other steels selected for specific desirable characteristics.

The centrifugal casting technique is also applicable to producing a raw composite material for use in bulk fabrication processes having an enhanced concentration of a particulate. For example, billets of MMCs having greater than the typical maximum 20 volume percent of SiC can be produced using the present invention, simply by adding additional particulates of the SiC before the mold is spun or while it is spinning.

It is apparent that the equipment used to produce the examples discussed above would need to be modified to achieve a large scale commercial application of the present invention. However, the underlying concept used in the present invention is readily scaled up to meet commercial manufacturing requirements for volume and production costs. In view of the substantially enhanced strength and other mechanical characteristics of parts cast using the present invention, and the simplicity of applying casting techniques to make such composite materials, it will be apparent that the present invention represents a significant advance in the art.

Although the present invention has been described in connection with the preferred form of practicing it and modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for casting an object in a mold from a composite material, comprising the steps of:
   (a) adding the composite material to the mold, said composite material being a mixture comprising a first material and a second material, said second material having a greater density than said first material;
   (b) causing the composite material to be in a fluid state within the mold;
   (c) rotating the mold about an axis of rotation for a time interval, said step of rotating developing a centrifugal force tending to move the second material away from said axis of rotation generally toward a periphery of the mold, creating a greater concentration of the second material nearer the periphery of the mold than adjacent to the rotational axis in an extended gradient distribution that produces desired material enhancements in a predetermined portion of the casting without causing an abrupt transition between regions of greater and lower concentration of said second material; and
   (d) causing the composite material to solidify in a shape defined by the mold leaving the second material distributed in the non-homogeneous extended gradient distribution pattern in the composite comprising the casting.

2. The method of claim 1, wherein the step of rotating the mold is controlled in accord with a predefined profile, said predefined profile being determined as a function of a velocity, an acceleration, and a deceleration of the mold during the step of rotating.

3. The method of claim 1, further comprising the step of controlling a temperature of the composite material disposed within the mold.

4. The method of claim 3, wherein the temperature of the composite material is controlled according to a predefined temperature profile that defines a rate of change of said temperature.

5. The method of claim 4, wherein the temperature of the composite material is controlled according to the predefined temperature profile using a variable temperature control that controls an exchange of heat with the mold.

6. The method of claim 1, wherein the step of causing the composite material to be in a fluid state comprises the step of liquefying the composite material.

7. The method of claim 1, wherein the step of causing the composite material to solidify in the shape defined by the mold comprises the step of cooling said composite material.

8. The method of claim 7, wherein the step of cooling comprises the step of quenching an exterior surface of the mold with a fluid having a lower temperature than the mold.

9. The method of claim 7, wherein the step of cooling comprises the step of cooling the periphery of the mold with a fluid having a lower temperature than the mold.

10. The method of claim 1, wherein the composite material includes a polymer.

11. The method of claim 10, wherein the step of causing the composite material to solidify in the shape defined by the mold comprises the step of providing a catalyst agent in the composite material that promotes hardening of the polymer.

12. The method of claim 1, wherein, after the composite material has solidified, the concentration of the second material varies generally uniformly from a minimum adjacent to the axis of rotation to a maximum adjacent the periphery of the mold.

13. The method of claim 1, wherein, after the composite material has solidified, the concentration of the second material increases non-uniformly from a minimum adjacent to the axis of rotation to a maximum adjacent to the periphery of the mold.

14. The method of claim 1, further comprising the steps of extracting the composite material from the mold after the step of causing the composite material to solidify; and removing a portion of the composite material, leaving a remainder of the composite material.

15. The method of claim 14, wherein a material property that includes one of a strength, a modulus, a thermal expansion coefficient, a thermal conductivity, and a wear property of the composite material increases with an increased concentration of the second material, the remainder of the composite material including a sufficient concentration of the second material so that said material property is substantially enhanced, compared to that of the portion that was removed.

16. The method of claim 14, wherein a material property that includes one of a strength, a modulus, a thermal expansion coefficient, a thermal conductivity, and a wear property of the composite material increases with an increased concentration of the first material, the portion of the composite material that was removed including a sufficient concentration of the first material so that said material property is substantially enhanced, compared to that of the remainder of the composite material.

17. The method of claim 1, wherein the fluid mixture includes the first material in a fluid state and the second material in a solid state, said second material comprising particles that are suspended in said first material.

18. The method of claim 17, wherein a shape of the particles is characterized by having a relatively high aspect ratio.

19. The method of claim 17, wherein each of the particles has one of a whisker shape, a platelet shape, and a fiber shape.

20. The method of claim 17, wherein the particles are characterized by being of substantially different sizes.

21. The method of claim 17, wherein the particles are generally spherical in shape.

22. The method of claim 1, wherein the fluid mixture includes the second material in a fluid state and the first material in a solid state, said first material comprising particles that are suspended in said first material.

23. The method of claim 22, wherein a shape of the particles is characterized by having a relatively high aspect ratio.

24. The method of claim 22, wherein each of the particles has one of a whisker shape, a platelet shape, and a fiber shape.

25. The method of claim 22, wherein the particles are characterized by being of substantially different sizes.

26. The method of claim 1, wherein the shape defined by the mold includes a portion that is radially shadowed by another portion of the shape.

27. The method of claim 1, wherein the shape defined by the mold is asymmetrical.

28. The method of claim 1, wherein the shape defined by the mold is symmetrical.

29. The method of claim 1, wherein the first material is selected from the group consisting of aluminum, magnesium, and a polymer.

30. The method of claim 1, wherein the second material is selected from the group consisting of silicon carbide, alumina, boron carbide, titanium carbide, boron nitride, silicon nitride, aluminum nitride, zircon, zirconium carbide, zirconium diboride, and graphite.

31. A method for casting an object in a mold from a composite material, comprising the steps of:
    (a) at least partially filling the mold with a mixture of a first material that is a liquid and a second material that is a solid, one of said first material and said second material having a greater density than the other;
    (b) rotating the mold about an axis of rotation for a time interval, said rotating producing a centrifugal force that tends to cause said one of the first material and the second material to move away from said axis of rotation, creating a greater concentration of said one of the first material and the second material nearer a periphery of the mold than adjacent to the axis of rotation in an extended gradient distribution that produces desired material enhancements in a predetermined portion of the casting without an abrupt transition in the concentration of said one of the first material and the second material; and
    (c) causing the mixture to solidify into a composite material having a shape defined by the mold so that the second material remains in the extended gradient non-homogeneous distribution pattern in the composite comprising the casting.

32. A method for producing a composite material having a particulate reinforcement, said composite material having a relatively high mass compared to that of the particulate reinforcement, comprising the steps of:
    (a) in a mold, providing a mixture of a first material comprising particles and a second material comprising a liquid, said liquid having a greater density than said particles;
    (b) rotating the mold about an axis of rotation for a time interval, said rotating producing a centrifugal force that tends to cause the second material to move towards a periphery of the mold, creating a greater concentration of the second material nearer the periphery of the mold than adjacent to the axis of rotation and a greater concentration of the first material adjacent to said axis of rotation;
    (c) causing the mixture to solidify into a shape defined by the mold, said shape comprising the composite material having a non-homogeneous distribution of the first material and the second material;
    (d) extracting the shape from the mold; and
    (e) removing a portion of the shape disposed around the rotational axis, leaving a remainder of the composite material, said portion having a greater concentration of the first material than the remainder and having a substantially greater tensile strength than said remainder.

33. The method of claim 32, wherein the first material is selected from the group consisting of silicon carbide, alumina, and boron carbide.

34. The method of claim 32, wherein the second material comprises a stainless steel.

35. A method for producing a composite material having a particulate reinforcement, said composite material having a relatively low mass compared to that of the particulate reinforcement, comprising the steps of:
    (a) in a mold, providing a mixture of a first material comprising a liquid and a second material comprising particles, said particles having a greater density than said liquid;
    (b) rotating the mold about an axis of rotation for a time interval, said rotating producing a centrifugal force that tends to cause the second material to move towards a periphery of the mold, creating a greater concentration of the second material nearer the periphery of the mold than adjacent to the axis of rotation;
    (c) causing the mixture to solidify into a shape defined by the mold, said shape comprising the composite material having a non-homogeneous distribution of the first material and the second material;
    (d) extracting the shape from the mold; and
    (e) removing a portion of the shape disposed around the rotational axis, leaving a remainder of the composite material, said remainder having a greater concentration of the second material than the portion removed and having a substantially greater tensile strength than said portion.

36. A method for producing a composite material having a relatively higher particulate reinforcement than that of an initial composite material, comprising the steps of:
    (a) in a mold, providing the initial composite material in a liquid state;
    (b) rotating the mold about an axis of rotation for a time interval, said rotating producing a centrifugal force that tends to cause the particulate reinforcement to become more concentrated adjacent a periphery of the mold than about the axis of rotation;
    (c) causing the composite material to solidify into a shape defined by the mold;
    (d) extracting the shape from the mold; and
    (e) removing a portion of the shape adjacent the axis of rotation, leaving a remainder that comprises the composite material having the higher particulate reinforcement than the initial composite material.

37. The method of claim 36, wherein the concentration of the particulate reinforcement in the remainder of the composite material is greater than about 20 volume percent.

38. The method of claim 36, wherein the concentration of the particulate reinforcement in the remainder of the composite material is from about 20 volume percent to more than about 65 volume percent.

39. A method for creating an increased concentration of a reinforcing component in a base component to facilitate formation of a composite material having a concentration of the reinforcing component that is substantially greater than that achievable by simply mixing the reinforcing component into the base component, comprising the steps of:

(a) causing the base component to be in a fluid state within a container;

(b) adding the reinforcing component to the container;

(c) rotating the container about an axis of rotation for a time interval, said step of rotating developing a centrifugal force tending to overcome a surface tension of the base component in the fluid state, thereby causing the reinforcing component to be wetted by the base component, forming a non-homogenous mixture of the base component and the reinforcing component, said non-homogeneous mixture being adapted to be mechanically mixed to form a substantially homogeneous composite having the greater concentration of the reinforcing component.

40. A method for increasing a concentration of a reinforcing component relative to a base component in a composite material, where said composite material initially has a first concentration of the reinforcing component, said reinforcing component having a substantially greater density than said base component, comprising the steps of:

(a) causing the composite material to be in a fluid state within a container;

(b) rotating the container about an axis of rotation for a time interval, said step of rotating developing a centrifugal force tending to move the reinforcing component away from said axis of rotation generally toward a periphery of the container, creating a region adjacent to the axis of rotation in which the relative concentration of the reinforcing component is much less than said first concentration, and also creating a region nearer the periphery of the container in which the concentration of the reinforcing component is much greater than said first concentration, said region of greater concentration of the reinforcing component exhibiting a substantially homogeneous distribution of the reinforcing component at a second concentration;

(d) stopping the rotation of the container and solidifying said composite material; and (e) removing and discarding said region adjacent to the axis of rotation, so that a remainder of the composite exhibits the second concentration of said reinforcing component.

* * * * *

UNITED STATES PATENT AND TRADEMARK OFFICE
CERTIFICATE OF CORRECTION

PATENT NO. : 5,980,792

DATED : November 9, 1999

INVENTOR(S) : Chamlee

It is certified that error appears in the above-identified patent and that said Letters Patent is hereby corrected as shown below:

Column 25, line 13, after "container;" insert --and--

Column 26, line 20, change "(d)" to --(c)--

Column 26, line 22, change "(e)" to --(d)--

Signed and Sealed this

Fifth Day of December, 2000

Attest:

Attesting Officer

Q. TODD DICKINSON

Director of Patents and Trademarks